(12) United States Patent
Cho et al.

(10) Patent No.: US 11,014,272 B2
(45) Date of Patent: May 25, 2021

(54) LAUNDRY BEAD MOLDING MOLD, LAUNDRY BEAD AND LAUNDRY BEAD MOLDING METHOD

(71) Applicant: WHEALTHFIELDS (GUANGZHOU) CO., LTD., Guangdong (CN)

(72) Inventors: Tai Yung Titus Cho, Guangdong (CN); Jing Wang, Guangdong (CN); Haitao Liu, Guangdong (CN)

(73) Assignee: WHEALTHFIELDS (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 16/391,286

(22) Filed: Apr. 22, 2019

(65) Prior Publication Data

US 2020/0230850 A1 Jul. 23, 2020

Related U.S. Application Data

(63) Continuation of application No. PCT/CN2019/077306, filed on Mar. 7, 2019.

(30) Foreign Application Priority Data

Jan. 18, 2019 (CN) .......................... 201910049415.0
Mar. 1, 2019 (CN) .......................... 201910156385.3

(51) Int. Cl.
*B29C 43/36* (2006.01)
*B29C 43/20* (2006.01)
(Continued)

(52) U.S. Cl.
CPC ............ *B29C 43/36* (2013.01); *B29C 43/206* (2013.01); *C11D 11/0082* (2013.01); *B29K 2031/04* (2013.01); *B29K 2995/0062* (2013.01)

(58) Field of Classification Search
CPC . C11D 17/0042; C11D 11/0082; B29C 43/36; B29C 43/206
(Continued)

(56) References Cited

U.S. PATENT DOCUMENTS

| 9,725,685 | B2 * | 8/2017 | Brandt-Sanz | ............. B65B 9/04 |
| 2017/0057716 | A1 * | 3/2017 | Fowler | ................... B65D 65/46 |
| 2019/0316066 | A1 * | 10/2019 | Ellson | ................... B65D 65/46 |

FOREIGN PATENT DOCUMENTS

| CN | 105539902 A | 5/2016 |
| CN | 106956793 A | 7/2017 |

(Continued)

OTHER PUBLICATIONS

English Translation of CN206624198U (Year: 2017).*
The extended European Search Report of counterpart European Patent Application No. 19724330.6 dated Apr. 28, 2020.

*Primary Examiner* — Matthew J Daniels
*Assistant Examiner* — Hana C Page

(57) ABSTRACT

A laundry bead molding mold is disclosed, including a first mold cavity and a second mold cavity which are separated from each other and could be filled with detergent or detergent additives to meet different washing demands. The first mold cavity has two opposite side walls at a certain angle, which could ensure the shape of the bead product is a preset shape. The mold could be used to mold a laundry bead having at least two cavities, and could obtain a multifunctional laundry bead, has a simple structure and a high yield of the formed bead. A laundry bead formed by the mold is also disclosed, including a plurality of beads, which facilitates the washing process. A laundry bead molding method is also disclosed.

4 Claims, 4 Drawing Sheets

(51) Int. Cl.
*C11D 11/00* (2006.01)
*B29K 31/00* (2006.01)

(58) Field of Classification Search
USPC .......................................................... 156/242
See application file for complete search history.

(56) References Cited

FOREIGN PATENT DOCUMENTS

| | | |
|---|---|---|
| CN | 206624198 U | 11/2017 |
| CN | 108609237 A | 10/2018 |
| JP | 2009533287 A | 9/2009 |

\* cited by examiner

LAUNDRY BEAD MOLDING MOLD, LAUNDRY BEAD AND LAUNDRY BEAD MOLDING METHOD

CROSS REFERENCE TO RELATED APPLICATION

The present application is a Continuation Application of PCT Application No. PCT/CN2019/077306 filed on Mar. 7, 2019, which claims the benefit of Chinese Patent Application Nos. 201910049415.0 filed on Jan. 18, 2019 and 201910156385.3 filed on Mar. 1, 2019. All the above are hereby incorporated by reference.

FIELD OF THE INVENTION

The present application relates to the technical field of daily chemical products, and more particularly, to a laundry bead molding mold, a laundry bead which changes from an obtuse angle to a right angle, and a laundry bead molding method.

BACKGROUND OF THE INVENTION

Laundry bead is an innovative washing product that has emerged in the past two years, and because its shape likes a bead, it is named as the laundry bead, and the product is soft to the touch and cute in shape, leading the new trend in the laundry market. Laundry bead is a water-soluble concentrated laundry detergent with high-efficiency cleaning ability, and the laundry bead is specially designed for machine washing, and the laundry bead is easy to operate, convenient and does not dirty hands, and it has high cleaning ability and is easy to rinse, which can effectively remove stubborn stains to make clothing as clean as new.

The existing laundry bead generally comprises only one cavity, and only one concentrated cleaning agent is provided inside, and when cleaning different clothes and the like, it is often necessary to add detergent, bactericide, biological agent, softener, whitening agent and skin-friendly agent, so when using the existing laundry bead to wash the clothing, one also need to add the above-mentioned cleaning agent, causing the operation is cumbersome, and various cleaning agents need to be purchased and stored separately, occupying a large space. In addition, in the production process of the laundry bead, the outer film of the laundry bead needs to be vacuum plasticized, and the elastic outer film tends to deform, and after restoring to normal pressure, the pressure caused by the elastic deformation causes the bead product is not completely consistent with the preset shape.

SUMMARY OF THE INVENTION

The present application has been provided to solve one or more deficiencies of the above related art. According to the technical solutions of the present application, the problem that one need to add additional detergent additive when using the existing laundry bead to wash clothing and/or the product molded by the existing laundry bead mold is not completely consistent with the preset shape could be solved.

To solve the above problem, the technical solution of the present application is:

The present application provides a laundry bead molding mold, comprising a first mold cavity and a second mold cavity which are separate from each other.

Further, the second mold cavity is at least partially surrounded by the first mold cavity.

Further, the first mold cavity is a gate shape having a smooth inner edge, and the second mold cavity is disposed inside a notch of the gate shape.

Further, the cross section of the inner edge of the first mold cavity is a circular arc shape, and the cross section of the second mold cavity is a circular shape, and the second mold cavity is suitably disposed in a space formed by the inner edge of the first mold cavity.

Further, the first mold cavity comprises a first side wall, a second side wall and a third side wall which are disposed on the two sides of the first side wall, and also comprises a fourth side wall which is simultaneously connected to the second side wall and the third side wall to form a closed cavity.

Further, the fourth side wall has a circular arc segment adapted to the periphery of the second mold cavity.

Further, the second side wall and the third side wall are at an angle of 0.5-30 degrees.

Further, the first mold cavity and/or the second mold cavity are composed of at least two cavities which are separate.

A laundry bead, molded by the above mold, comprising a plurality of beads.

A laundry bead molding method, using the above mold to mold, comprising:

1) pulling a PVA water-soluble film to the mold, and plasticizing the PVA water-soluble film in the first mold cavity and the second mold cavity under the absorbing effect of the mold;

2) then filling at least one of a detergent, a bactericide, a biological agent, a softener, a whitening agent and a skin-friendly agent into the first mold cavity;

3) filling at least one of the detergent, the bactericide, the biological agent, the softener, the whitening agent and the skin-friendly agent into the second mold cavity;

4) pulling another PVA water-soluble film to the mold, and pressing or bonding the two PVA water-soluble films under the action of a press roll, to obtain a laundry bead having at least two cavities.

Compared with the prior art, the above technical solution of the present application has the following advantages:

(1) According to the laundry bead molding mold of the present application, it comprises the first mold cavity and the second mold cavity that are separated from each other. The mold could be used to form a laundry bead having at least two cavities, and the two cavities could be respectively filled with at least one of detergent (especially concentrated detergent), bactericide, biological agent, softener, whitening agent and skin-friendly agent, thereby obtaining a multi-functional laundry bead, and the mold has a simple structure and a high yield of the formed laundry beads.

(2) According to the laundry bead molding mold of the present application, the cross section of the inner edge of the first mold cavity is in a circular arc shape and the cross section of the second mold cavity is a circular, and the second mold cavity is disposed in a space formed by the inner edge of the first mold cavity to form a double cavity structure, or the second mold cavity is composed of at least two cavities, so as to form a three-cavity structure or a multi-cavity structure. The mold has a regular shape, and is easy to store and beautiful in appearance, and could be filled with a plurality kind of detergent additives or detergents, which has a wide range of uses and functions.

(3) According to the laundry bead molding mold of the present application, the first mold cavity comprises the first side wall, the second side wall and the third side wall which are disposed on two sides of the first side wall, and the fourth side wall which is connected to the second side wall and the third side wall, wherein, there is a certain angle between the second side wall and the third side wall, for example, 0.5-30 degrees, which could solve the problem that the appearance of the laundry bead product is deformed caused by the elastic deformation after the vacuum is released and it is difficult to ensure the appearance of the laundry bead product, and by setting the two side walls of the mold at the certain angle, the vacuum-formed bead in the first mold cavity will restore to elasticity under normal pressure, to ensure a predetermined exterior structure (for example, a rectangular shape).

(4) The laundry bead according to the present application comprises a plurality of beads, which could be respectively used for setting at least one of detergent, bactericide, biological agent, softener, whitening agent and skin-friendly agent, so the laundry process is simple, in addition, the laundry bead has a rectangular structure and has side walls which are perpendicular to each other, so it has good shape consistency and beautiful appearance.

BRIEF DESCRIPTION OF THE DRAWINGS

In order to more easily and clearly understand the content of the present application, the present application will be further described in detail below according to the embodiments of the present application and the accompanying drawings. Wherein.

Figure 1:
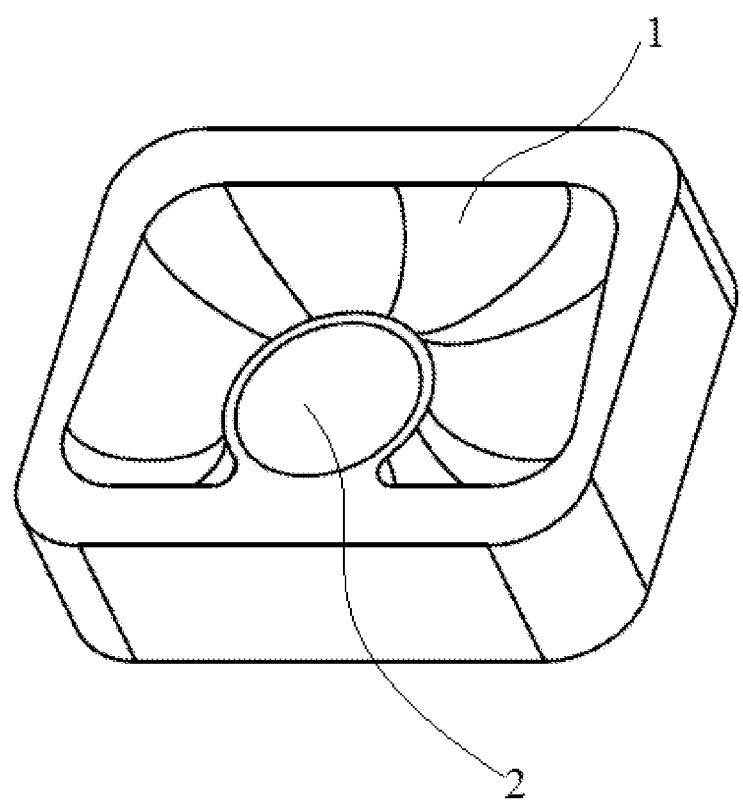
FIG. 1 is a structural schematic diagram of a laundry bead molding mold provided by the present application.

The reference numerals in the figures are denoted as: 1—First mold cavity; 11—First side wall; 12—Second side wall; 13—Third side wall; 14—Fourth side wall; 2—Second mold cavity; 3—First bead portion; 4—Second bead portion.

The present application could be implemented in a variety of different manners, and should not be construed as being limited to the embodiments set forth herein. On the contrary, the provided embodiments make the present disclosure be thorough and complete and make the concept of the present application fully conveyed to the person skilled in the art, and the present application will be defined by the claims. In the drawings, the sizes and relative dimensions of the various devices are exaggerated for clarity. The terms "first", "second" and the like in the specification and the claims and the drawings of the present application are used to distinguish similar objects, and are not necessarily used to describe a particular order or precedence order. It should be understood that the data used in such a way could be interchanged where appropriate. Besides, the terms "comprising", "having" and any variants thereof are meant to cover non-exclusive inclusions.

DESCRIPTION OF THE EMBODIMENTS

Figure 2:
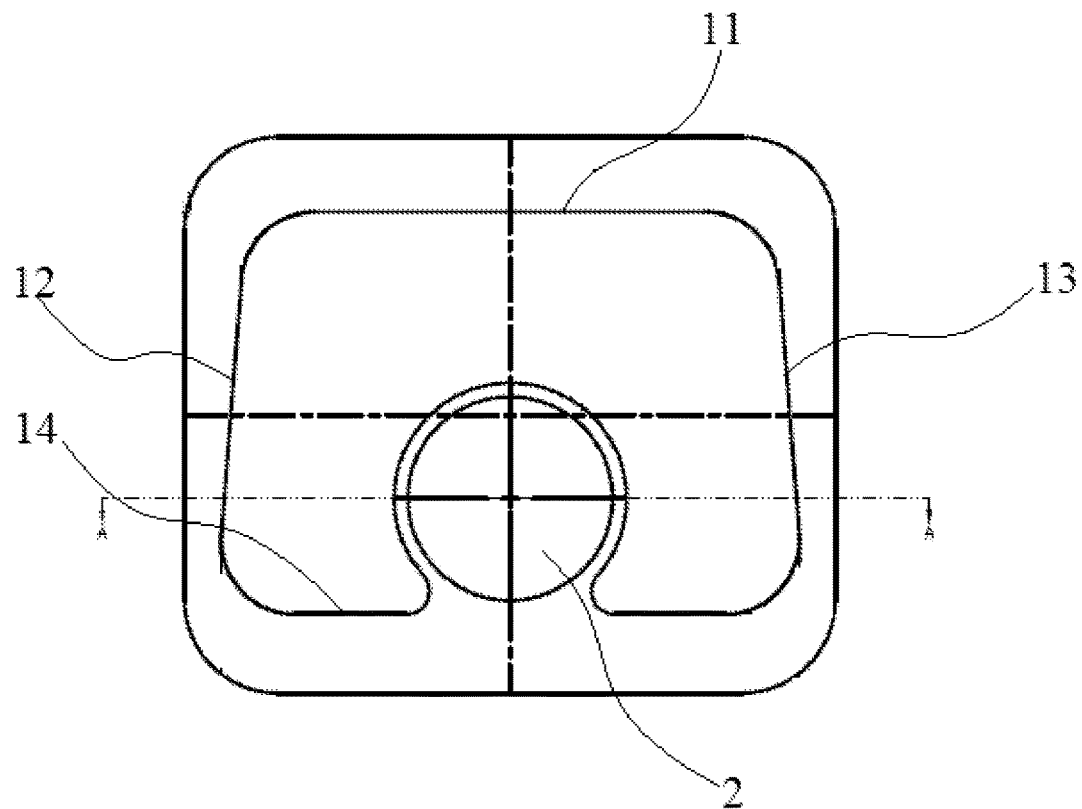
FIG. 2 is a cross-sectional schematic diagram of a laundry bead molding mold provided by the present application.

As shown in the FIG. 1-2, the present application provides a laundry bead molding mold for molding a water-soluble film made of a material such as PVA and a laundry detergent into a laundry bead, and the mold is connected to a vacuum-pumping system. The laundry bead molding mold comprises a first mold cavity 1 and a second mold cavity 2 which are separated from each other. By setting the separate mold cavities, it is possible to selectively fill detergent (especially concentrated detergent), detergent, bactericide, biological agent, softener, whitening agent or skin-friendly agent into different mold cavities, thereby obtaining a multifunctional laundry bead, and the mold has a simple structure, and has a high yield of the formed laundry beads.

Preferably, the first mold cavity 1 and the second mold cavity 2 are respectively used to accommodate at least one of detergent, bactericide, biological agent, softener, whitening agent and skin-friendly agent.

Preferably, the second mold cavity 2 is at least partially surrounded by the first mold cavity 1, so that the structure of the prepared laundry bead is compact.

Preferably, the first mold cavity 1 is a gate shape with a smooth inner edge, and the second mold cavity 2 is disposed inside the notch of the gate shape.

Preferably, the cross section of the inner edge of the first mold cavity 1 is in a circular arc shape, the cross section of the second mold cavity 2 is circular, and the second mold cavity 2 is suitably disposed in the space formed by the inner edge of the first mold cavity 1, and in order to make the formed laundry bead has a beautiful shape, the arc inner edge of the first mold cavity 1 is concentrically arranged with the second mold cavity 2. Of course, as a changeable embodiment, the cross-sectional shape of the second cavity 2 may also be other shape such as a square, a triangle, or the like. Preferably, the first mold cavity 1 comprises a first side wall 11, a second side wall 12 and a third side wall 13 which are disposed on two sides of the first side wall 11, and also comprises a fourth side wall 14 which is simultaneously connected to the second side wall 12 and the third side wall 13 to form a closed cavity, and the fourth side wall 14 has a circular arc segment adapted to the periphery of the second mold cavity 2. The second side wall 12 and the third side wall 13 are connected to the first side wall 11 by a smooth circular arc side wall.

Further, in order to obtain laundry beads which have a rectangular shape and have a good uniformity and a flat surface, the second side wall 12 and the third side wall 13 are at an angle of 0.5-30 degrees, preferably 9 degrees. Since the PVA water-soluble film has certain elasticity, it's difficult to make the shape of the laundry bead be consistent with the preset shape under the condition that the elastic deformation is restored after the vacuum plasticity, and if the cross-section of the mold cavity is rectangular, the two sides of the formed bead are at obtuse angle. By setting the two opposite side walls of the mold at certain angle, and selecting the angle values for different vacuum degrees or other parameters, it's possible to ensure that the bottom of the cross section of the formed laundry bead is a completely closed rectangle with four sides which are approximately perpendicular to each other. The above-mentioned laundry bead molding mold could ensure the angle of the shape of the molded product.

Preferably, the second mold cavity 2 is circular, and the ratio of the diameter of the second mold cavity 2 to the length of the wide side (that's, the second side wall 12, the third side wall 13) of the first mold cavity 1 is 1/10-9/10.

Preferably, the center of the second mold cavity 2 is in the middle of the longitudinal direction of the second side wall 12 and the third side wall 13.

In order to meet different washing applications and prepare different specifications of laundry bead, the parameters of the mold are different. Preferably, the diameter of the second mold cavity 2 is 22 mm, and the length of the shorter side (top side in the figure) of the first mold cavity 1 is 57.8 mm, and the length of the longer side (bottom side in the figure) is 62.2 mm, and the width is 43.4 mm, and the radius of the curved side wall is 8 mm. The depth of the first mold cavity 1 and the second mold cavity 2 is 0.1-30 mm, preferably 7.8 mm, and the quality of the produced laundry bead is 22 g.

Preferably, the diameter of the second mold cavity 2 is 34.1 mm, and the length of the top side of the first mold cavity 1 is 89.6 mm, and the length of the bottom side is 96.4 mm, and the width is 67.3 mm, and the radius of the curved side wall is 12.4 mm. The depth of the first mold cavity 1 and the second cavity 2 is 0.1-30 mm, preferably 12.2 mm, and the quality of the produced laundry bead is 100 g.

Preferably, the diameter of the second mold cavity 2 is 14.3 mm, and the length of the top side of the first mold cavity 1 is 37.6 mm, and the length of the bottom side is 40.4 mm, and the width is 28.2 mm, and the radius of the curved side wall is 5.2 mm. The depth of the first mold cavity 1 and the second cavity 2 is 0.1-30 mm, preferably 5.1 mm, and the quality of the produced laundry bead is 5 g.

A laundry bead molding method is also provided, comprising the following steps: 1) pulling a PVA water-soluble film to the above mold, and plasticizing the PVA water-soluble film in the first mold cavity 1 and the second mold cavity 2 under the absorbing effect of the mold; 2) then filling at least one of detergent, bactericide, biological agent, softener, whitening agent and skin-friendly agent into the first mold cavity 1; 3) filling at least one of detergent, bactericide, biological agent, softener, whitening agent and skin-friendly agent into the second mold cavity 2; 4) pulling another PVA water-soluble film to the above mold, and pressing or bonding the two PVA water-soluble films under the action of a press roll, to obtain a laundry bead having at least two cavities.

Figure 3:
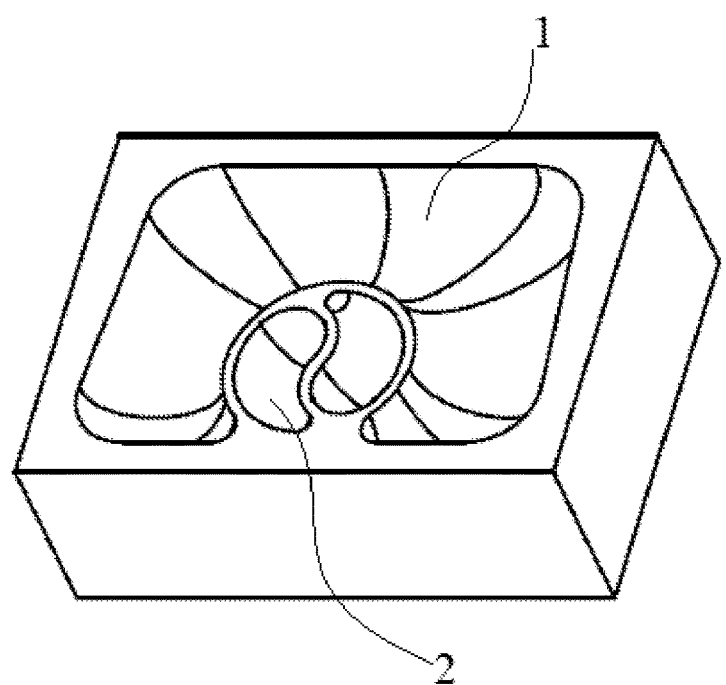
FIG. 3 is a structural schematic diagram of another laundry bead molding mold provided by the present application.
Figure 4:
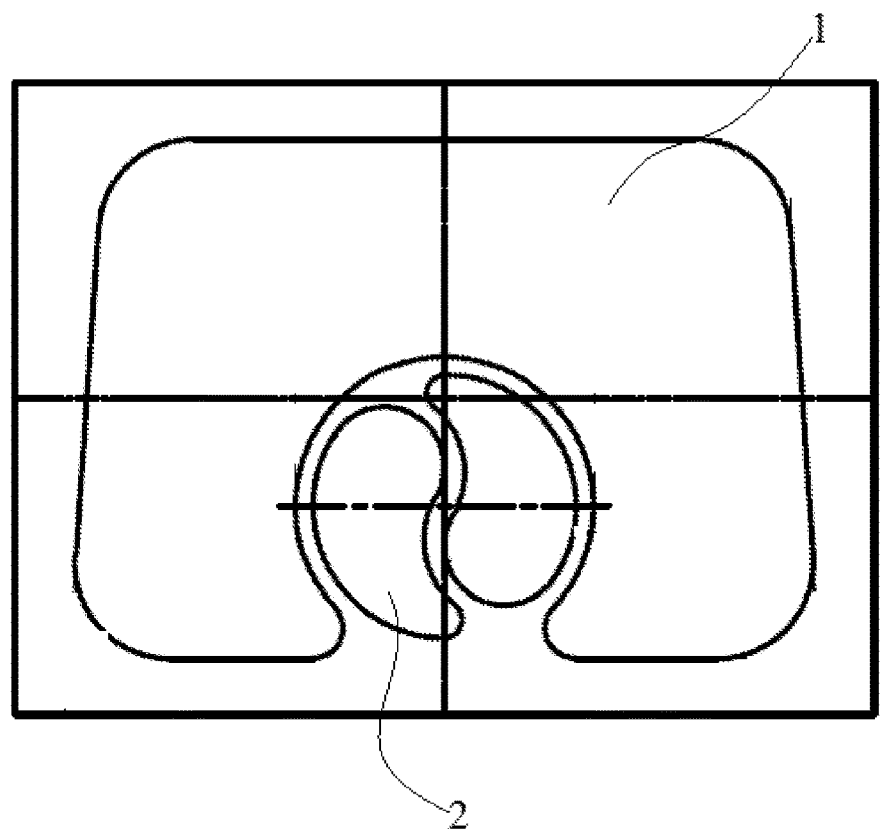
FIG. 4 is a cross-sectional schematic diagram of another laundry bead molding mold provided by the present application.

As shown in FIG. 3-4, another laundry bead molding mold provided by the present application also comprises a first mold cavity 1 and a second mold cavity 2 which are separated from each other, wherein the first mold cavity 1 is a gate shape with a smooth inner edge, and the second mold cavity 2 is disposed inside the notch of the gate shape, and the cross section of the inner edge of the first mold cavity 1 is in a circular arc shape, and what's different is that the second mold cavity 2 of the present embodiment is composed of two cavities which are separated from each other. Preferably, the cross sections of the two cavities form an eight-diagram pattern, and the outer periphery of the cavity synthesize a circle with vacancies, and the ratio of the diameter of the outer periphery of the two cavities to the length of the wide side (that's, the second side wall 12, the third side wall 13) of the first mold cavity 1 is 1/10-9/10, preferably 1/2. Of course, the second mold cavity could also be composed of other-shaped cavities, and the number of the cavity is not limited to two, thereby forming a molding mold with multiple cavities, and finally producing a laundry bead with multiple cavities which could be filled with various detergents or detergent additives. It could be understood in the art that the first mold cavity 1 could also be composed of at least two cavities which are separated from each other, so that the first mold cavity 1 could also be filled with various detergents or detergent additives to satisfy various washing demands.

Figure 5:
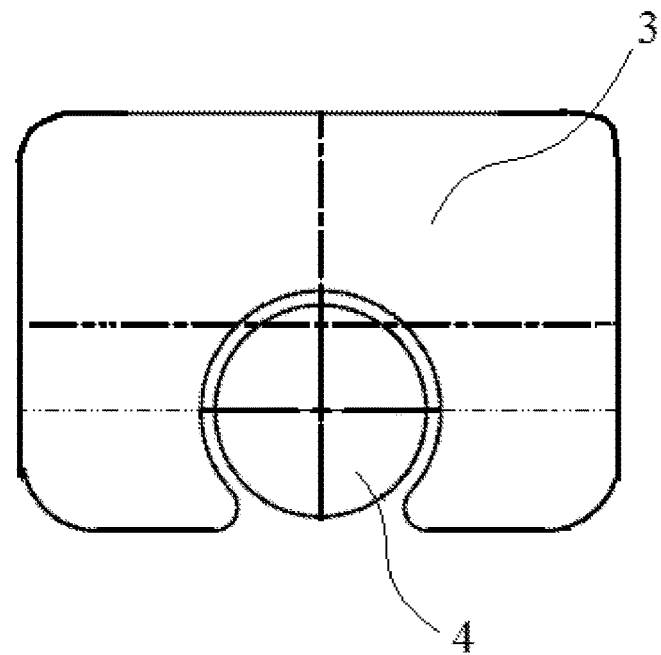
FIG. 5 is a cross-sectional schematic diagram of a laundry bead formed by the laundry bead molding mold provided by the present application.
Figure 6:
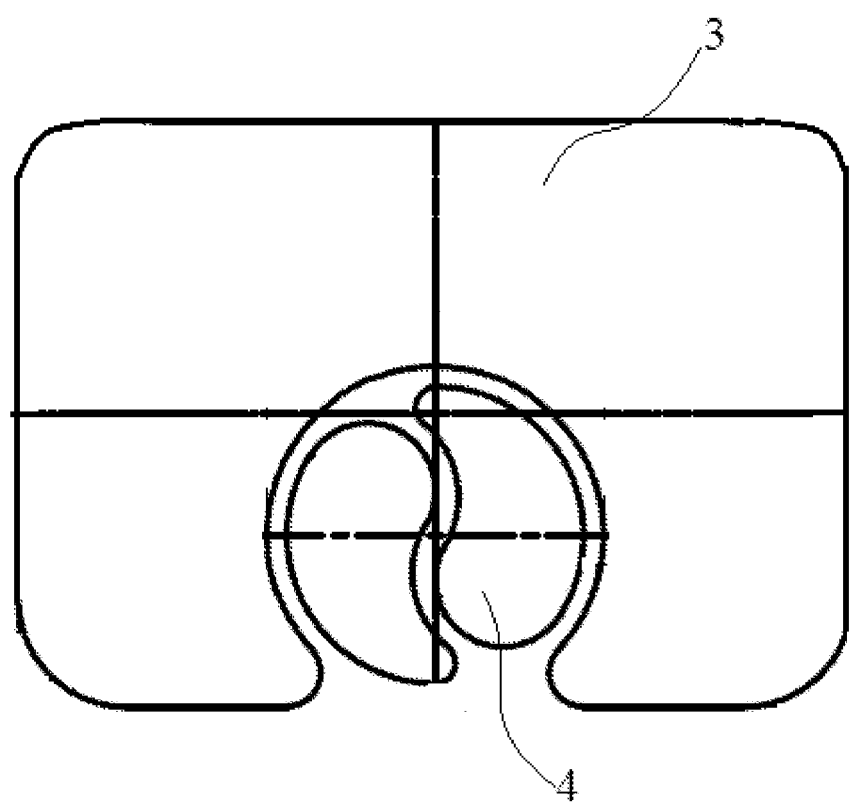
FIG. 6 is a cross-sectional schematic diagram of another laundry bead formed by the laundry bead molding mold provided by the present application.

FIG. 5-6 are different laundry beads molded by the laundry bead molding molds provided by the present application, as shown in FIG. 5, the laundry bead comprises a first bead portion 3 and a second bead portion 4 which are connected to but not intercommunication with each other, and the second bead portion 4 is at least partially surrounded by the first bead portion 3, wherein the first bead portion 3 is a gate shape with a smooth inner edge, and the second bead portion 4 is disposed inside the notch in the middle of the gate shape, and the second bead portion 4 is a spherical shape, and the first bead portion 3 has a rectangular outer circumference and a circular arc inner circumference. The first bead portion 3 could be filled with a detergent, especially a concentrated detergent. The second bead portion 4 could be filled with at least one of detergent, bactericide, biological agent, softener, whitening agent and skin-friendly agent, preferably a whitening agent. The color of the concentrated detergent may be different from the color of other detergent additives, and the water-soluble PVA film outside the bead is a transparent film, so as to get the technical effect of forming a double color bead which has a more beautiful appearance. The second bead portion 4 has a tensile force of 1-100 N, and the laundry bead have an overall weight of 1-100 g, preferably 22 g. Through the molding process of the molding mold, the shape of the laundry beads has a high degree of uniformity, and after being taken out from the mold cavity and restoring to a normal pressure, the laundry bead has an approximately rectangular shape. As shown in FIG. 6, another laundry bead comprises a first bead portion 3 and a second bead portion 4 which are connected to but not intercommunication with each other, and the first bead portion 3 has a rectangular outer circumference and a circular arc inner circumference, and the first bead portion 3 could be filled with a detergent, especially a concentrated detergent. The second bead portion 4 is composed of two second bead units, and the two second bead units are connected to but not intercommunication with each other, and the two second bead units form an eight-diagram pattern, and the two second bead units could be respectively filled with at least one of detergent, bactericide, biological agent, softener, whitening agent and skin-friendly agent, preferably, the two second bead units are respectively filled with the bactericide and the softener. Besides, in order to improve the aesthetic of the bead product, the color of the detergents filled in the first bead portion 3 and the two second bead units may be different, so as to form the effect of three-color bead.

Obviously, the above embodiments are merely illustrative for clear description and are not intended to limit the implementation manner. For person skilled in the art, other various forms of variations or modifications may be made on the basis of the above description. There is no need and no way to exhaust all of the implementations. Obvious changes or variations deriving from those are still within the protection scope created by this application.

What is claimed is:

1. A laundry bead molding mold, comprising a first mold cavity and a second mold cavity which are separate from each other;

wherein the second mold cavity is at least partially surrounded by the first mold cavity;

wherein the first mold cavity comprises a first side wall having a straight segment, a second side wall having a straight segment, a third side wall having a straight segment, and a fourth side wall, the second side wall and the third side wall are disposed on the two sides of the first side wall, and the fourth side wall is simultaneously connected to the second side wall and the third side wall to form a closed cavity; and wherein an angle between an extension line of the straight segment of the second side wall and an extension line of the straight segment of the third side wall is 0.5-30 degrees;

wherein the fourth side wall has a circular arc segment adapted to the periphery of the second mold cavity.

2. The laundry bead molding mold according to claim 1, wherein the first mold cavity is a gate shape having a smooth inner edge, and the second mold cavity is disposed inside a notch of the gate shape.

3. The laundry bead molding mold according to claim 2, wherein the cross section of the inner edge of the first mold cavity is a circular arc shape, and the cross section of the second mold cavity is a circular shape, and the second mold cavity is suitably disposed in a space formed by the inner edge of the first mold cavity.

4. The laundry bead molding mold according to claim 1, wherein the first mold cavity and/or the second mold cavity are composed of at least two cavities which are separate.

* * * * *